US009238326B2

(12) United States Patent  
Totani

(10) Patent No.: US 9,238,326 B2  
(45) Date of Patent: Jan. 19, 2016

(54) PRINT PITCH CORRECTING APPARATUS FOR PLASTIC FILM

(71) Applicant: TOTANI CORPORATION, Kyoto (JP)

(72) Inventor: Mikio Totani, Kyoto (JP)

(73) Assignee: TOTANI CORPORATION, Kyoto (JP)

( * ) Notice: Subject to any disclaimer, the term of this patent is extended or adjusted under 35 U.S.C. 154(b) by 360 days.

(21) Appl. No.: 14/044,156

(22) Filed: Oct. 2, 2013

(65) Prior Publication Data  
US 2014/0099394 A1   Apr. 10, 2014

(30) Foreign Application Priority Data

Oct. 5, 2012   (JP) .................................. 2012-223404

(51) Int. Cl.  
*B29C 55/02* (2006.01)  
*B41F 33/00* (2006.01)  
*B41F 13/04* (2006.01)  
*B65H 23/188* (2006.01)  
*B31B 1/00* (2006.01)

(52) U.S. Cl.  
CPC . *B29C 55/02* (2013.01); *B31B 1/00* (2013.01); *B41F 13/04* (2013.01); *B41F 33/0081* (2013.01); *B65H 23/1884* (2013.01); *B31B 2219/88* (2013.01); *B31B 2219/95* (2013.01); *B65H 2301/4493* (2013.01); *B65H 2301/5124* (2013.01); *B65H 2511/172* (2013.01); *B65H 2511/512* (2013.01); *B65H 2553/41* (2013.01); *B65H 2701/191* (2013.01)

(58) Field of Classification Search  
CPC ...... B29C 31/04; B29C 31/08; B29C 31/085; B29C 55/02; B29C 55/15

USPC .................................................. 425/135, 145  
See application file for complete search history.

(56) References Cited

U.S. PATENT DOCUMENTS 5,470,300 A   11/1995 Terranova  
2004/0132599 A1   7/2004 Colla

FOREIGN PATENT DOCUMENTS

| JP | 2003-048260 | | 2/2003 |
| JP | 2005001114 A | * | 1/2005 |
| JP | 4461201 | | 2/2010 |
| WO | 2010/005102 | | 1/2010 |

OTHER PUBLICATIONS

EPO search report for application EP 13187332, Jan. 31, 2014.  
Australian patent examination report for application AU 2013237677, Jun. 5, 2015.

* cited by examiner

*Primary Examiner* — Timothy Kennedy  
(74) *Attorney, Agent, or Firm* — Kirschstein, Israel, Schiffmiller & Pieroni, P.C.

(57) ABSTRACT

It is intended to correct print pitches P at which a pattern A is printed on a plastic film 1 repeatedly. A first optical sensor detects positions at which the pattern A is printed on the plastic film 1 repeatedly, to measure the print pitches P individually. A first stretching device 4 stretches the plastic film 1 after measuring the print pitch P to correct the print pitches P individually. A second optical sensor detects the positions after correcting the print pitch P to measure a sum of print pitches $P(1)+P(2)+ - - - +P(N)$ of a number of patterns A. A second stretching device 10 stretches the plastic film 1 after measuring the sum of print pitches to correct the sum of print pitches.

15 Claims, 3 Drawing Sheets

A

B

A

B

PRINT PITCH CORRECTING APPARATUS FOR PLASTIC FILM

TECHNICAL FIELD

The invention relates to an apparatus for correcting print pitches at which a pattern is printed on a plastic film repeatedly.

BACKGROUND

For example, in a machine for successively making plastic bags each of which includes a pattern printed thereon, a plastic film is fed longitudinally thereof. The plastic film includes the pattern printed thereon repeatedly, with a print pitch being predetermined. The plastic film is fed intermittently for a length corresponding to the print pitch and stopped temporarily whenever being fed intermittently. In general, plastic films are superposed with each other. The plastic films are then heat sealed with each other by a heat seal device and cross cut by a cross cutter whenever being fed intermittently and when being stopped temporarily, to successively make plastic bags.

In this case, conformity in pattern is required between the plastic films. On the other hand, minute errors must exist in the print pitches of plastic film to be accumulated, resulting in a discrepancy in pattern between the plastic films. In order to overcome this problem, there has been proposed an apparatus for correcting the print pitches, as disclosed in Japanese Patent No. 4,121,722.

In the apparatus of the patent, a plurality of optical sensors are disposed at a path along which the plastic films are fed, to detect and compare positions at which the patterns are printed on the plastic films repeatedly. In addition, the apparatus is arranged to heat a specific film partially to stretch it by tension at a position predetermined upstream of the optical sensors when the specific film goes ahead of other films. The apparatus can therefore correct the print pitches, conformity in pattern being obtained between the plastic films.

However, the apparatus can merely correct the print pitches of the plastic films relatively to each other. The apparatus cannot correct the print pitches individually to keep them at a fixed value. In addition, when stretching the plastic film, the print pitch is fluctuated by the stretching amount. The plastic films are then heat sealed with each other and cross cut by the heat seal device and the cross cutter at a position predetermined with respect to the pattern. The plastic bag must therefore have a size changed by the print pitch fluctuated. The apparatus cannot keep the size constant. Furthermore, the heat seal device and the cross cutter have to be moved by a drive means for adjustment of position when operating the machine so that the plastic films should be heat sealed and cross cut at the position predetermined with respect to the pattern, resulting in technical problems.

It has also been proposed in the patent to keep an average of print pitches constant by correcting the print pitches. However, the apparatus cannot correct the print pitches individually all the same. It can merely keep the average of print pitches.

By the way, the apparatus is arranged to heat the plastic film partially to stretch it by tension, as described previously. However, the plastic film is not always suitable for heating. There has therefore been proposed a device for stretching a plastic film in a different way, as disclosed in Japanese Patent Publication No. 4,461,201. The device can stretch a plastic film by using rollers without heating the plastic film partially.

It is therefore an object of the invention to provide an apparatus for correcting print pitches at which a pattern is printed on a plastic film repeatedly, which can correct the print pitches individually.

SUMMARY OF THE INVENTION

According to the invention, the apparatus includes feeding rollers by which the plastic film is fed intermittently for a length corresponding to the print pitch and stopped temporarily whenever being fed intermittently. The apparatus further includes a first optical sensor disposed at a path along which the plastic film is fed intermittently, and detecting positions at which the pattern is printed on the plastic film repeatedly, to measure the print pitches individually. The apparatus further includes a first stretching device disposed at the path and downstream of the first optical sensor and stretching the plastic film after measuring the print pitch and when the plastic film is stopped temporarily, to correct the print pitches individually. The apparatus further includes a second optical sensor disposed at the path and detecting the positions after correcting the print pitches, to measure a sum of print pitches of a number of patterns. The apparatus further includes a second stretching device disposed at the path and stretching the plastic film after measuring the sum of print pitches and when the plastic film is stopped temporarily, to correct the sum of print pitches.

In a preferred embodiment, the apparatus further includes a control device arranged to measure the print pitches individually and obtain measurement values in response to detecting signals transmitted from the first optical sensor. The first stretching device is operated by the control device to stretch the plastic film and correct the print pitch when the measurement value is less than a reference value to result in a difference exceeding a predetermined value, between the measurement value and the reference value.

The control device is arranged to recognize if the print pitch contains a short or excess correcting amount after correcting. The short or excess correcting amount is stored in the control device and then cleared by the measurement value of next print pitch to obtain a cleared value. The first stretching device is operated by the difference between the cleared value, which is used as the measurement value, and the reference value.

The predetermined value comprises a minimum stretching amount predetermined in the first stretching device. The first stretching device is operated by the control device to stretch the plastic film when the measurement value is less than the reference value to result in the difference exceeding the minimum stretching amount. The control device is arranged to recognize if the print pitch is shortage by an uncorrected amount less than the minimum stretching amount after correcting. The uncorrected amount is stored in the control device and then subtracted from the measurement value of next print pitch to obtain a subtracted value. The first stretching device is operated by the difference between the subtracted value, which is used as the measurement value, and the reference value.

The control device is arranged to measure the sum of print pitches of the number of patterns to obtain a measurement value in response to a detecting signal transmitted from the second optical sensor. The second stretching device is operated by the control device to stretch the plastic film and correct the sum of print pitches when the measurement value is less than a reference value to result in a difference exceeding a predetermined value, between the measurement value and the reference value.

The control device is arranged to recognize if the sum of print pitches contains a short or excess correcting amount after correcting. The short or excess correcting amount is stored in the control device and then cleared by the measurement value of next sum of print pitches to obtain a cleared value. The second stretching device is operated by the difference between the cleared value, which is used as the measurement value, and the reference value.

The predetermined value comprises a minimum stretching amount predetermined in the second stretching device. The second stretching device is operated by the control device to stretch the plastic film when the measurement value is less than the reference value to result in the difference exceeding the minimum stretching amount. The control device is arranged to recognize if the sum of print pitches is shortage by an uncorrected amount less than the minimum stretching amount after correcting. The uncorrected amount is stored in the control device and then subtracted from the measurement value of next sum of print pitches to obtain a subtracted value. The second stretching device is operated by the difference between the subtracted value, which is used as the measurement value, and the reference value.

An upstream optical sensor is disposed at the path. A downstream optical sensor is disposed at the path and downstream of the upstream optical sensor and spaced from the upstream optical sensor at a distance corresponding to an integral multiple of reference value of print pitch. The upstream and downstream optical sensors detect the positions at which the pattern is printed on the plastic film repeatedly. The first optical sensor comprises the upstream optical sensor to measure the print pitches individually. The second optical sensor comprises the upstream and downstream optical sensors to measure the sum of print pitches of the number of patterns.

An additional optical sensor may be disposed at the path and upstream of the upstream optical sensor and spaced from the upstream optical sensor at a distance corresponding to the print pitch or an integral multiple thereof. The additional optical sensor detects the positions at which the pattern is printed on the plastic film repeatedly. The first optical sensor comprises the upstream optical sensor and the additional optical sensors to measure the print pitches individually.

The first stretching device is disposed downstream of the upstream optical sensor. The downstream optical sensor is disposed downstream of the first stretching device. The second stretching device is disposed downstream of the downstream optical sensor.

In another embodiment, the first and second stretching devices comprise a single stretching device disposed downstream of the upstream optical sensor. The downstream optical sensor is disposed downstream of the single stretching device.

The feeding rollers are disposed at the path and downstream of the upstream optical sensor. The feeding rollers are operated by the control device in response to the detecting signals transmitted from the upstream optical sensor so that the plastic film should be fed intermittently for the length corresponding to the print pitch.

The apparatus is incorporated in a machine including a heat seal device and a cross cutter. The plastic films are superposed with each other after correcting the print pitches. The plastic films are then heat sealed with each other by the heat seal device and cross cut by the cross cutter, to successively make plastic bags.

Consequently, according to the invention, the upstream optical sensor, the feeding rollers, the first stretching device, the downstream optical sensor and the second stretching device are disposed at the path along which the plastic film is fed. The control device is arranged to measure the print pitches individually to obtain the measurement values in response to the detecting signals transmitted from the upstream optical sensor. The first stretching device is operated by the control device to stretch the plastic film and correct the print pitches individually when the measurement value is less than the reference value of print pitch to result in the difference exceeding a first predetermined value and when the plastic film is stopped temporarily. The control device is further arranged to measure the sum of print pitches of the number of patterns to obtain the additional measurement value in response to the detecting signals transmitted from the upstream and downstream optical sensors. The second stretching device is operated by the control device to stretch the plastic film and correct the sum of print pitches when the additional adjustment value is less than the reference value of sum of print pitches to result in the difference exceeding a second predetermined value and the plastic film is stopped temporarily.

A plastic film stretching device may be disposed at the path to stretch the plastic film and correct the print pitches individually. The plastic film stretching device is used to stretch the plastic film and correct the sum of print pitches.

BEST MODE TO CARRY OUT THE INVENTION

Embodiments of the invention are as follows.

Figure 1:
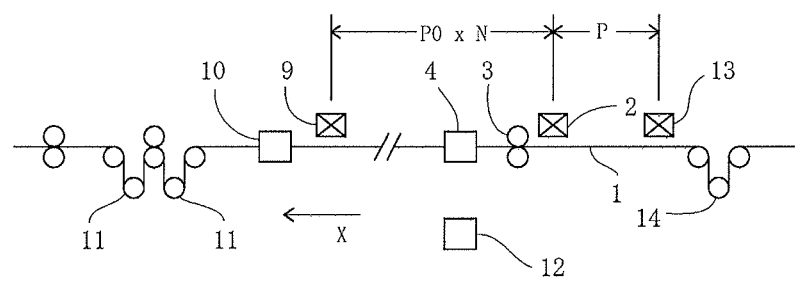
FIG. 1 is a side view (A) of a preferred embodiment of the invention and a plan view (B) of the plastic film of (A).
Figure 1:
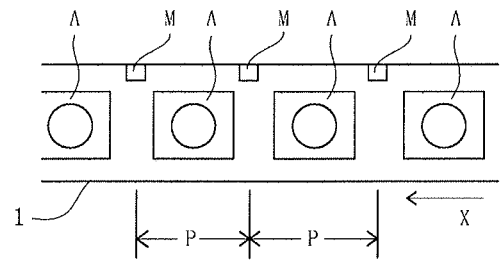

Turning now to the drawings, FIG. 1 illustrates an apparatus for correcting print pitches P at which a pattern A is printed on a plastic film 1 repeatedly, according to the invention. In the apparatus, the plastic film 1 is fed in a direction X and longitudinally thereof. The plastic film 1 includes the pattern A printed thereon repeatedly, with the print pitch P being predetermined. The print pitch P is compared with a reference value P0, as described later in detail. The plastic film 1 is fed intermittently for a length corresponding to the print pitch P and stopped temporarily whenever being fed intermittently.

The apparatus includes a first optical sensor disposed at a path along which the plastic film 1 is fed, and detecting positions at which the pattern A is printed on the plastic film 1 repeatedly, to measure the print pitches P individually. In the embodiment, an upstream optical sensor 2 is disposed at the path, the upstream optical sensor 2 detecting positions at which the pattern A is printed on the plastic film 1 repeatedly. For example, marks M are additionally printed on the plastic film 1 at the positions. A mark sensor is used as the upstream optical sensor 2 to detect the marks M or the positions. The first optical sensor comprises the upstream optical sensor 2 to measure the print pitches individually. The apparatus further includes feeding rollers 3 disposed at the path and downstream of the upstream optical sensor 2. The plastic film 1 is sandwiched between and fed by the feeding rollers 3 which are rotated by a drive motor. The feeding rollers 3 comprise rubber rollers.

The apparatus further includes a first stretching device 4 disposed at the path and downstream of the first optical sensor and stretching the plastic film 1 longitudinally thereof, after measuring the print pitch P and when the plastic film is stopped temporarily, to correct the print pitches individually. In the embodiment, the first optical sensor comprises the upstream optical sensor 2, as described previously. The first stretching device 4 is therefore disposed at the path and downstream of the upstream optical sensor 2. In addition, the feeding rollers 3 are disposed at the path and downstream of the upstream optical sensor 2 while the first stretching device 4 is disposed at the path and downstream of the feeding rollers 3. The first stretching device 4 is spaced from the upstream optical sensor 2 at a distance, as also described later.

Figure 2:
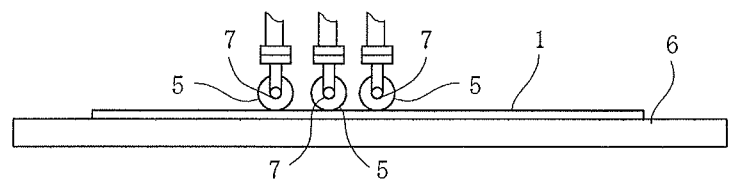
FIG. 2 is an elevational view (A) of the first stretching device of FIG. 1 and a side view (B) of the rollers of (A).
Figure 2:
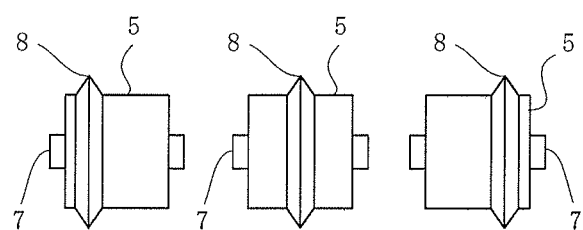

The first stretching device 4 comprises the device disclosed in Japanese Patent No. 4,461,201 and therefore includes rollers 5, as shown in FIG. 2. The plastic film 1 is fed longitudinally thereof and directed to a base 6. The rollers 5 are arranged widthwise of the plastic film 1, opposed to the plastic film 1 and the base 6 and supported by shafts 7 for rotation thereabout. The rollers 5 include tapered circumferential edges 8. The shafts 7 extend longitudinally of the plastic film 1. The first stretching device 4 further includes drive means by which the rollers 5 are moved and pushed downward so that the circumferential edges 8 should be pressed against the plastic film 1. In addition, the rollers 5 are moved widthwise of the plastic film 1 and rolled along the plastic film 1 to stretch the plastic film 1. The first stretching device 4 can select the number and type of rollers 5 to be moved downward, for adjustment of stretching amount of plastic film 1. It can increase the stretching amount to several times.

The apparatus further includes a second optical sensor disposed at the path along which the plastic film 1 is fed, and detecting the positions at which the pattern A is printed on the plastic film 1 repeatedly, after correcting the print pitches P, to measure a sum of print pitches P(1)+P (2)+ - - - +P(N) of a number of patterns A. In the embodiment, a downstream optical sensor 9 is disposed at the path and downstream of the upstream optical sensor 2 and spaced from the upstream optical sensor 9 at a distance corresponding to an integral multiple of reference value P0 of print pitch, the downstream optical sensor 9 detecting the positions at which the pattern A is printed on the plastic film 1 repeatedly. For example, a mark sensor is used as the downstream optical sensor 9 to detect the marks M or the positions, as in the case of the upstream optical sensor 2. The second optical sensor comprises the upstream and downstream optical sensors 2 and 9 to measure the sum of print pitches P(1)+P(2)+ - - - +P(N), as also described later.

The apparatus further includes a second stretching device 10 disposed at the path and stretching the plastic film 1 after measuring the sum of print pitches P(1)+P(2)+ - - - +P(N) and when the plastic film 1 is stopped temporarily, to correct the sum of print pitches P(1)+P(2)+ - - - +P(N). In the embodiment, the downstream optical sensor 9 is disposed at the path and downstream of the first stretching device 4 while the second stretching device 10 is disposed at the path and downstream of the downstream optical sensor 9. The second stretching device 10 has the same structure as the first stretching device 4 and therefore includes the rollers to stretch the plastic film 1. It can also select the number and type of the rollers to be moved downward, for adjustment of stretching amount of plastic film 1. The plastic film 1 then passes through dancer rollers 11 to be discharged.

The apparatus further includes a control device 12 connected to the upstream optical sensor 2, the feeding rollers 3, the first stretching device 4, the downstream optical sensor 9 and the second stretching device 10. The feeding rollers 3 are operated by the control device 12. The first and second stretching device 4 and 10 are also operated by the control device 12. In the embodiment, the feeding rollers 3 are rotated by the drive motor, as described previously. Accordingly, strictly speaking, the control device 12 is connected to the drive motor so that the feeding rollers 3 can be operated and rotated by the control device 12 and the drive motor. In addition, the first and second stretching devices 4 and 10 include the drive means by which the rollers 5 are moved to stretch the plastic film 1, as also described previously. The control device 12 is therefore connected to the drive means so that the rollers 5 can be operated and moved by the control device 12 and the drive means. The control device 12 comprises a computer.

In addition, the control device 12 is arranged to receive detecting signals transmitted from the upstream optical sensor 2. The feeding rollers 3 are operated by the control device 12 in response to the detecting signals transmitted from the upstream optical sensor 2 so that the plastic film 1 should be fed intermittently for the length corresponding to the print pitch P and stopped temporarily whenever being fed intermittently. The control device 12 is further arranged to measure the print pitches P individually to obtain measurement values in response to the detecting signals transmitted from the upstream optical sensor 2. The first stretching device 4 is operated by the control device 12 to stretch the plastic film 1 and correct the print pitches P individually when the measurement value is less than the reference value P0 to result in a difference P0−P exceeding a first predetermined value, between the measurement value and the reference value P0. In this connection, it should be understood that in general, the print pitch P is predetermined to be less than the reference value P0. It therefore often happens when measuring the print pitches P individually to obtain the measurement values that the measurement value is less than the reference value P0. The first stretching device is then operated to stretch the plastic film 1 and correct the print pitch when resulting in the difference P0−P exceeding the first predetermined value.

In the embodiment, an additional optical sensor 13 is disposed at the path and upstream of the upstream optical sensor 2 and spaced from the upstream optical sensor 2 at a distance corresponding to the print pitch P or an integral multiple thereof. The plastic film 1 passes through a dancer roller 14 to be directed to the additional optical sensor 13 and the upstream optical sensor 2, the additional optical sensor 13 and the upstream optical sensor 2 detecting the positions at which the pattern A is printed on the plastic film 1 repeatedly. For example, a mark sensor is used as the additional optical sensor 13 to detect the marks M or the positions. The first optical sensor comprises the upstream optical sensor 2 and the additional optical sensor 13 to measure the print pitches individually. In addition, the control device 12 is connected to the additional optical sensor 13 to receive detecting signals transmitted from the additional optical sensor 13. The control device 12 is arranged to measure the print pitches P individually to obtain the measurement values in response to the detecting signals transmitted from the additional optical sensor 13 and the upstream optical sensor 2. In this case, the additional optical sensor 13 and the upstream optical sensor 2 can detect the positions at which the pattern A is printed on the plastic film 1 repeatedly, when the plastic film 1 is stopped temporarily, to measure the print pitches P individually. As a result, the apparatus can measure the print pitches P exactly. The measurement value is then stored in the control device 12 when being less than the reference value V0 to result in the difference P0−P exceeding the first predetermined value, the plastic film 1 including a portion concerned with the measurement value. The first stretching device 4 is then operated by the control device 12 to stretch the plastic film 1 and correct the print pitch P when the plastic film 1 is fed by the feeding rollers 3 and the concerned portion reaches the first stretching device 4.

The control device 12 is arranged to recognize if the print pitch P contains a short or excess correcting amount after correcting. The short or excess correcting amount is stored in the control device 12 and then cleared by the measurement value of next print pitch P to obtain a cleared value. The first stretching device 4 is operated by the difference between the cleared value, which is used as the measurement value, and the reference value P0.

For example, in the embodiment, the first stretching device 4 includes the rollers 5 for adjustment of stretching amount of plastic film 1, as described previously. It can increase the stretching amount to several times. The first stretching device 4 can therefore stretch the plastic film 1 by a minimum stretching amount d, a double stretching amount 2d or a triple stretching amount 3d. In addition, in the first stretching device 4 stretching the plastic film 1 when resulting in the difference P0−P exceeding the first predetermined value, the first predetermined value comprises the minimum stretching amount d predetermined in the first stretching device 4. The first stretching device 4 therefore stretches the plastic film 1 to correct the print pitch P when resulting in the difference P0−P exceeding the minimum stretching amount d.

Furthermore, the print pitch P is predetermined to be less than the reference value P0 to result in a difference P0−P less than the double stretching amount 2d of first stretching device 4 (P0−P=0~2d). The control device 12 is arranged to stretch the plastic film 1 by the minimum stretching amount d when resulting in the difference P0−P not exceeding the double stretching amount 2d but exceeding the minimum stretching amount d after measuring the print pitch P. The control device 12 is further arranged to stretch the plastic film 1 by the double stretching amount 2d when resulting in the difference P0−P not exceeding the triple stretching amount 3d but exceeding the double stretching amount 2d.

The control device 12 is further arranged not to stretch the plastic film 1 and correct the print pitch P when resulting in the difference P0−P not exceeding the minimum stretching amount d. The print pitch P must therefore be shortage by an uncorrected amount less than the minimum stretching amount d after correcting. Under the circumstances, the control device 12 is arranged to recognize if the print pitch P is shortage by the uncorrected amount after correcting. The uncorrected amount is stored in the control device 12 and then subtracted from the measurement value of next print pitch P to obtain a subtracted value. The first stretching device 4 is operated by the difference between the subtracted value, which is used as the measurement value, and the reference value V0, to stretch the plastic film 1.

In addition, the control device 12 is arranged to stretch the plastic film 1 by the minimum stretching amount d when resulting in the difference P0−P not exceeding the double stretching amount 2d but exceeding the minimum stretching amount d, as described previously. It is also arranged to stretch the plastic film 1 by the double stretching amount 2d when resulting in the difference P0−P not exceeding the triple stretching amount 3d but exceeding the double stretching amount 2d. The print pitch P must therefore contain a short correcting amount after correcting. Under the circumstances, the control device 12 is arranged to recognize if the print pitch P contains the short correcting amount. The short correcting amount is stored in the control device 12 and then subtracted from the measurement value of next print pitch P to obtain a subtracted value. The first stretching device 4 is operated by the difference between the subtracted value, which is used as the measurement value, and the reference value P0, to stretch the plastic film 1.

The first predetermined value may comprise a predetermined amount less than the minimum stretching amount d of first stretching device 4. The first predetermined value may be small as much as possible. It may be zero. In this case, the first stretching device 4 stretches the plastic film 1 by the minimum stretching amount when resulting in the difference P0−P not exceeding the minimum stretching amount d. It stretches the plastic film 1 by the double stretching amount 2d when resulting in the difference P0−P not exceeding the double stretching amount 2d but exceeding the minimum stretching amount d. It stretches the plastic film 1 by the triple stretching amount 3d when resulting in the difference P0−P not exceeding the triple stretching amount 3d but exceeding the double stretching amount 2d.

In this case, in contraries, the print pitch P must contain an excess correcting amount after correcting. The control device 12 is therefore arranged to recognize if the print pitch P contains the excess correcting amount. The excess correcting amount is stored in the control device 12 and then added to the measurement value of next print pitch P to obtain an added value. The first stretching device 4 is operated by the difference between the added value, which is used as the measurement value, and the reference value P0.

In addition, the control device 12 is arranged to receive a detecting signal transmitted from the downstream optical sensor 9. The control device 12 is further arranged to measure the sum of print pitches P(1)+P(2)+ - - - +P(N) of the number of patterns A to obtain the additional measurement value in response to the detecting signals transmitted from the upstream and downstream optical sensors 2 and 9. The second stretching device 10 is operated by the control device 12 to stretch the plastic film 1 and correct the sum of print pitches P(1)+P(2)+ - - - +P(N) when the additional measurement value is less than a reference value P0×N of sum of print pitches to result in a difference S=ΣSi exceeding a second predetermined value and when the plastic film 1 is stopped temporarily. The sum of print pitches P(1)+P(2)+ - - - +P(N) exists between the upstream and downstream optical sensors 2 and 9. The reference value P0×N exists between the upstream and downstream optical sensors 2 and 9. Strictly speaking, the measurement value is stored in the control device 12 when resulting in the difference S=ΣSi exceeding the second predetermined value, the plastic film 1 including a portion concerned with the measurement. The second stretching device 10 is then operated by the control device 12 to stretch the plastic film 1 and correct the sum of print pitches P(1)+P(2)+ - - - +P(N) when the plastic film 1 is fed by the feeding rollers 3 and the concerned portion reach the second stretching device 10 and when the plastic film 1 is stopped temporarily.

The first stretching device 4 is spaced from the upstream optical sensor 2 at a distance corresponding to or less than the print pitch P of plastic film 1. In this situation, the additional optical sensor 13 and the upstream optical sensor 2 are used to measure the print pitches P individually, the plastic film 1 being fed by the feeding rollers 3, the first stretching device 4 stretching the plastic film 1 to correct the print pitches individually. The upstream and downstream optical sensors 2 and 9 are then used to measure the sum of print pitches P(1)+P(2)+ - - - +P(N). The sum of print pitches P(1)+P(2)+ - - - +P(N) is therefore composed of the print pitches P interposed between the upstream and downstream optical sensors 2 and 9 for measurement after correcting respectively.

The print pitch P may be considerable small. In this case, it may be difficult to make the first stretching device 4 spaced from the upstream optical sensor at the distance corresponding to or less than the print pitch P of plastic film 1. The sum of print pitches P(1)+P(2)+ - - - +P(N) can therefore not be composed of all of the print pitches P after correcting respectively. The sum of print pitches P(1)+P(2)+ - - - +P(N) contains print pitches P before correcting. However, the additional optical sensor 13 and the upstream optical sensor 2 can measure the print pitches P of plastic film 1 to calculate the uncorrected amount thereof. The upstream and downstream optical sensors 2 and 9 can measure the sum of print pitches P(1)+P(2)+ - - - +P(N) to obtain a provisional value. The uncorrected amount can then be added to the provisional value to be used as the measurement value.

In addition, the control device 12 is arranged to recognize if the sum of print pitches P(1)+P(2)+ - - - +P(N) contains a short or excess correcting amount after correcting. The short or excess correcting amount is stored in the control device 12 and then cleared by the measurement value of next sum of print pitches P(1)+P(2)+ - - - +P(N) to obtain a cleared value. The second stretching device 10 is operated by a difference S=ΣSi between the cleared value, which is used as the measurement value, and the reference value P0×N.

For example, in the embodiment, the second stretching device 10 includes the rollers 5 for adjustment of stretching amount of plastic film 1, as in the case of the first stretching device 4. The second stretching device 10 can stretch the plastic film 1 by a minimum stretching amount d, a double stretching amount 2d or a triple stretching amount 3d. In addition, in the second stretching device 10 stretching the plastic film 1 when resulting in the difference S=ΣSi exceeding the second predetermined value between the measurement value and the reference value P0×N, the second predetermined value comprises the minimum stretching amount d predetermined in the second stretching device 10. The second stretching device 10 therefore stretches the plastic film 1 to correct the sum of print pitches P(1)+P(2)+ - - - +P(N) when resulting in the difference S=ΣSi exceeding the minimum stretching amount d predetermined in the second stretching device 10.

In addition, it is unusual that the difference S=ΣSi exceeds the second predetermined value, between the measurement value and the reference value P0×N when measuring the sum of print pitches P(1)+P(2)+ - - - +P(N) by reason that the first stretching device 4 stretches the plastic film 1 to correct the print pitch P. In this connection, it should be understood that the second stretching device 10 does not stretch the plastic film 1 nor correct the sum of print pitches P(1)+P(2)+ - - - +P(N) when resulting in the difference S=ΣSi not exceeding the second predetermined value. The sum of print pitches P(1)+P(2)+ - - - +P(N) must therefore be shortage by an uncorrected amount less than the minimum stretching amount d. Under the circumstances, the control device 12 is arranged to recognize if the sum of print pitches P(1)+P(2)+ - - - +P(N) is shortage by the uncorrected amount. The uncorrected amount is stored in the control device 12. The uncorrected amount is then subtracted from the measurement value of next sum of print pitches P(1)+P(2)+ - - - +P(N) to obtain a subtracted value. The second stretching device 10 is operated by a difference S=ΣSi between the subtracted value, which is used as the measurement value, and the reference value P0×N.

In addition, the control device 12 is arranged to stretch the plastic film 1 by the minimum stretching amount d when resulting in the difference S=ΣSi not exceeding the double stretching amount 2d but exceeding the minimum stretching amount d, as described previously. It is also arranged to stretch the plastic film 1 by the double stretching amount 2d when resulting in the difference S=ΣSi not exceeding the triple stretching amount 3d but exceeding the double stretching amount 2d. The sum of print pitches P(1)+P(2)+ - - - +P(N) must therefore contain a short correcting amount after correcting. Under the circumstances, the control device 12 is arranged to recognize if the sum of print pitches P(1)+P(2)+ - - - +P(N) contains the short correcting amount. The short correcting amount is stored in the control device 12 and then subtracted from the measurement value of next sum of print pitches P(1)+P(2)+ - - - +P(N) to obtain a subtracted value. The second stretching device 10 is operated by a difference between the subtracted value, which is used as the measurement value, and the reference value P0×N, to stretch the plastic film 1.

The second predetermined value may comprise a predetermined amount less than the minimum stretching amount d of second stretching device 10. The second predetermined value may be small as much as possible. It may be zero. In this case, the second stretching device 10 stretches the plastic film 1 by the minimum stretching amount d when resulting in the difference S=ΣSi not exceeding the minimum stretching amount d. It stretches the plastic film 1 by the double stretching amount 2d when resulting in the difference S=ΣSi not exceeding the double stretching amount 2d but exceeding the minimum stretching amount d. It stretches the plastic film 1 by the triple stretching amount 3d when resulting in the difference S=ΣSi not exceeding the triple amount 3d but exceeding the double stretching amount 2d.

In this case, in contraries, the sum of print pitches P(1)+P(2)+ - - - +P(N) must contain an excess correcting amount after correcting. The control device is therefore arranged to recognize if the sum of print pitches P(1)+P(2)+ - - - +P(N) contains the excess correcting amount. The excess correcting amount is stored in the control device 12 and then added to the measurement value of next sum of print pitches P(1)+P(2)+ - - - +P(N) to obtain an added value. The second stretching device 10 is operated by the difference between the added value, which is used as the measurement value, and the reference value P0×N.

The second stretching device 10 may be disposed to stretch the plastic film 1 at any portion concerned with the sum of print pitches P(1)+P(2)+ - - - P(N) after measuring. It may be arranged to stretch the plastic film 1 once at the same portion or two or three times at two or three portions when stretching it by the double or triple stretching amount.

The apparatus may be arranged to measure the sum of print pitches P(1)+P(2)+ - - - +P(N) whenever the plastic film 1 is fed intermittently. It may be arranged to measure the sum of print pitches P(1)+P(2)+ - - - +P(N) whenever the plastic film 1 is fed intermittently several times. It may be arranged to measure the sum of print pitches P(1)+P(2)+ - - - P(N) whenever the plastic film 1 is fed intermittently a number of times corresponding to the print pitches P(1)+P(2)+ - - - +P(N) in the sum.

Figure 3:
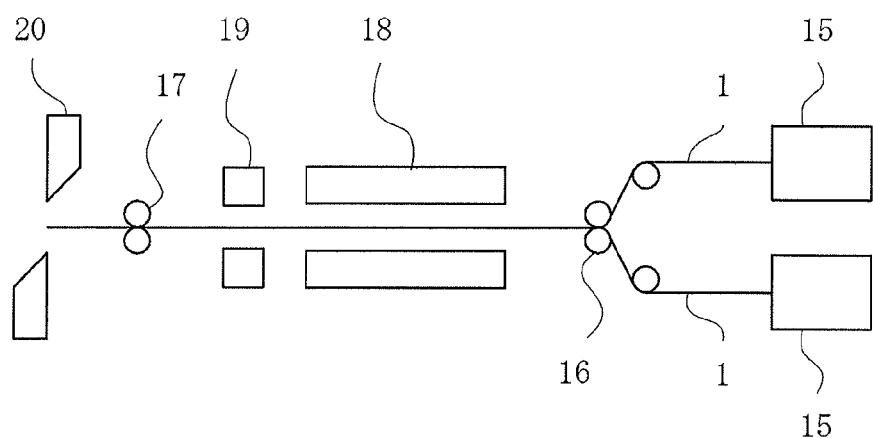
FIG. 3 is a side view of a plastic bag making machine including the apparatus of FIG. 1.

In the embodiment, there is used a plurality of the apparatuses 15 for correcting print pitches P at which patterns A are printed on plastic films 1 repeatedly, as shown in FIG. 3. The apparatuses are incorporated in a machine including guide rollers 16, feeding rollers 17, a heat seal device 18 and 19 and a cross cutter 20. The plastic films 1 are directed to the guide rollers 16 to be superposed with each other after correcting the print pitches P. The plastic films 1 are then directed to the feeding rollers 17 by which the plastic films 1 is fed intermittently for a length corresponding to the print pitch P and stopped temporarily whenever being fed intermittently. In addition, the plastic films 1 are heat sealed with each other by the heat seal device 18 and 19 and cross cut by the cross cutter 20 whenever being fed intermittently and when stopped temporarily, to successively make plastic bags. For example, the heat seal device comprises longitudinal and cross seal devices 18 and 19. The plastic films 1 are heat sealed by the longitudinal seal device 18 longitudinally thereof and heat sealed by the cross seal device 19 widthwise of the plastic films 1. The plastic films 1 are then cross cut by the cross cutter 20 to successively make the plastic bags.

Accordingly, in the apparatus, the additional optical sensor 13 and the upstream optical sensor 2 are used to measure the print pitches P individually. The first stretching device 4 then stretches the plastic film 1 after measuring the print pitches P, to correct the print pitches P individually. It is intended to correct the print pitch P toward the reference value P0.

In addition, the upstream and downstream optical sensors 2 and 9 are used to measure the sum of print pitches $P(1)+P(2)+ \cdots P(N)$ of a number of patterns A after correcting the print pitches P. The second stretching device 10 then stretches the plastic film 1 after measuring the sum of print pitches $P(1)+P(2)+ \cdots +P(N)$, to correct the sum of print pitches $P(1)+P(2)+ \cdots P(N)$, if necessary.

The apparatus can therefore correct the print pitches P in a two-stage process. As a result, the apparatus can correct the print pitches P individually and exactly to keep them at the reference value P0 or a fixed value.

The apparatus can therefore overcome the problem of discrepancy in pattern between the plastic films 1 due to the accumulated errors of print pitches when being incorporated in the machine for successively making the plastic bags. In the machine, the plastic films 1 are superposed with each other, heat sealed with each other by the heat seal device 18 and 19 and then cross cut by the cross cutter 20, to successively make the plastic bags. The apparatus can further overcome the problem of print pitch fluctuated to make the plastic bag have a size changed, described previously in connection with the apparatus of Japanese Patent No. 4,121,722. In addition, the heat seal devices 18 and 19 and the cross cutter 20 have not to be moved by a drive means for adjustment of position, not resulting in technical problems.

Figure 4:
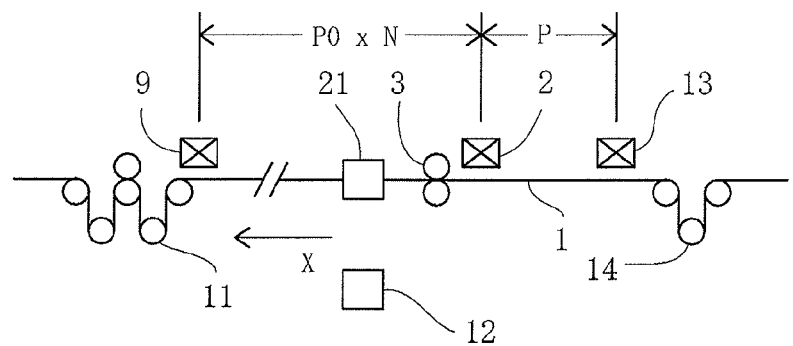
FIG. 4 is a side view of another embodiment.

In another embodiment of FIG. 4, the additional optical sensor 13, the upstream optical sensor 2 and the feeding rollers 3 are disposed at the path along which the plastic films 1 are fed, as in the case of the embodiment of FIG. 1. However, the first and second stretching device comprises a single stretching device 21 disposed at the path and downstream of the upstream optical sensor 2 and feeding rollers 2. The downstream optical sensor 9 is disposed at the path and downstream of the single stretching device 21. The single stretching device 21 comprises a plastic film stretching device stretching the plastic film 1 longitudinally thereof. The plastic film stretching device 21 has the same structure as the devices 4 and 10 of FIG. 1. The plastic film stretching device can therefore stretch the plastic film 1 by the minimum stretching amount d, the double stretching amount 2d or the triple stretching amount 3d.

The downstream optical sensor 9 is spaced from the upstream optical sensor 2 at the distance corresponding to the integral multiple of reference value P0 of print pitch. The control device 12 is connected to the additional optical sensor 13, the upstream optical sensor 2, the feeding rollers 3, the plastic film stretching device 21 and the downstream optical sensor 9.

In addition, the control device 12 receives the detecting signals transmitted from the upstream optical sensor 2. The feeding rollers 3 are operated by the control device 12 in response to the detecting signals transmitted from the upstream optical sensor 2 so that the plastic films 1 should be fed intermittently for the length corresponding to the print pitch P and stopped temporarily whenever being fed intermittently. The control device 12 further receives the detecting signals transmitted from the additional optical sensor 13. The control device 12 then measures the print pitches P individually to obtain the measurement values in response to the detecting signals transmitted from the additional optical sensor 13 and the upstream optical sensor 2. The plastic film stretching device 21 is operated by the control device 12 to stretch the plastic film 1 and correct the print pitches P individually when the measurement value is less than the reference value P0 to result in the difference P0−P exceeding the first predetermined value and when the plastic film 1 is stopped temporarily. The first predetermined value comprises the minimum stretching amount d of plastic film stretching device 21. The first predetermined value may comprise the predetermined value less than the minimum stretching amount d of plastic film stretching device 21. The first predetermined value may be small as much as possible. It may be zero, as also in the embodiment of FIG. 1.

Furthermore, the control device 12 receives the detecting signals transmitted from the downward optical sensor 9. The control device 12 then measures the sum of print pitches $P(1)+P(2)+ \cdots +P(N)$ of the number of patterns A to obtain the additional measurement value in response to the detecting signals transmitted from the upstream and downstream optical sensors 2 and 9. The plastic film stretching device 21 is operated by the control device 12 to stretch the plastic film 1 and correct the sum of print pitches $P(1)+P(2)+ \cdots +P(N)$ when the additional measurement value is less than the reference value P0×N of sum of print pitches to result in the difference $S=\Sigma Si$ exceeding the second predetermined value and when the plastic film 1 is stopped temporarily. The second predetermined value comprises the minimum stretching amount d of plastic film stretching device 21. The second predetermined value may comprise the predetermined amount less than the minimum stretching amount d of plastic film stretching device 21. The second predetermined value may be small as much as possible. It may be zero.

In the apparatus of FIG. 4, the sum of print pitches $P(1)+P(2)+ \cdots +P(N)$ is composed of the print pitches P interposed between the upstream and downstream optical sensors 2 and 9 for measurement after correcting respectively. The sum of print pitches $P(1)+P(2)+ \cdots +P(N)$ may contain print pitches P before correcting. In this case, the upstream and downstream optical sensors 2 and 13 may measure the sum of print pitches $P(1)+P(2)+ \cdots +P(N)$ to obtain a provisional value. The uncorrected amount is then be added to the provisional amount to be used as the measurement value.

The plastic film stretching device 21 may stretch the plastic film 1 to correct the print pitches P or the sum of print pitches $P(1)+P(2)+ \cdots +P(N)$ after the additional optical sensor 13 and the upstream optical sensor 2 measure the print pitches P of plastic film 1 or the upstream and downstream optical sensors 2 and 9 measure the sum of print pitches $P(1)+P(2)+ \cdots +P(N)$. The plastic film stretching device 21 may be intended to correct the print pitch P and the sum of print pitches $P(1)+P(2)+ \cdots P(N)$ at the same time.

In the apparatus of FIG. 4, the control device 12 is arranged to recognize if the sum of print pitches $P(1)+P(2)+ \cdots +P(N)$ contains a short or excess correcting amount after correcting. The short or excess correcting amount is stored in the control device 12 and then cleared by the measurement value of next sum of print pitches $P(1)+P(2)+ \cdots +P(N)$ to obtain the cleared value. The plastic film stretching device 21 is operated by the difference $S=\Sigma Si$ between the cleared value, which is used as the measurement value, and the reference value $P0 \times N$.

For example, the sum of print pitches $P(1)+P(2)+ - - - +P(N)$ may contain the short correcting amount, after correcting. In this case, the short correcting amount is subtracted from the measurement value of next sum of print pitches $P(1)+P(2)+ - - - P(N)$ to obtain the subtracted value. The plastic film stretching device 21 is operated by the difference $S=\Sigma Si$ between the subtracted value, which is used as the measurement value, and the reference value $P0 \times N$. The sum of print pitches $P(1)+P(2)+ - - - P(N)$ may contain the excess correcting amount, after correcting. In this case, the excess correcting amount is added to the measurement value of next sum of print pitches $P(1)+P(2)+ - - - P(N)$ to obtain the added value. The plastic film stretching device 21 is operated by the difference $S=\Sigma Si$ between the added value, which is used as the measurement value, and the reference value $P0 \times N$.

The sum of print pitches $P(1)+P(2)+ - - - +P(N)$ may be shortage by the uncorrected amount less than the minimum stretching amount d. In this case, the uncorrected amount should be subtracted from the measurement value of next sum of print pitches $P(1)+P(2)+ - - - +P(N)$ to obtain the subtracted value. The plastic film stretching device 21 is operated by the difference $S=\Sigma Si$ between the subtracted value, which is used as the measurement value, and the reference value $P0 \times N$.

The apparatus may be arranged to measure the sum of print pitches $P(1)+P(2)+ - - - +P(N)$ whenever the plastic film 1 is fed intermittently. It may be arranged to measure the sum of print pitches $P(1)+P(2)+ - - - +P(N)$ whenever the plastic film 1 is fed intermittently several times. It may be arranged to measure the sum of print pitches $P(1)+P(2)+ - - - +P(N)$ whenever the plastic film 1 is fed intermittently a number of times corresponding to the print pitches $P(1)+P(2)+ - - - +P(N)$ in the sum.

A plurality of the apparatuses are incorporated in a machine in which plastic films 1 are superposed with each other after correcting the print pitches P, as in the case of the embodiment of FIGS. 1 to 3. The plastic films 1 are heat sealed with each other by the heat seal device and then cross cut by the cross cutter to successively make the plastic bags.

Accordingly, in the apparatus of FIG. 4, the plastic film stretching device 21 stretches the plastic film 1 after measuring the print pitches P, to correct the print pitches P individually. In addition, the upstream and downstream optical sensors 2 and 9 are used to measure the sum of print pitches $P(1)+P(2)+ - - - +P(N)$ of the number of patterns A after correcting the print pitches P. The plastic film stretching device 21 then stretches the plastic film 1 to correct the sum of print pitches $P(1)+P(2)+ - - - +P(N)$, if necessary. The apparatus can therefore correct the print pitches P in a two-stage process.

As a result, the apparatus can correct the print pitches P individually and exactly to keep them at the reference value P0 or a fixed value.

What is claimed is:

1. An apparatus for correcting print pitches at which a pattern is printed on a plastic film repeatedly, the apparatus comprising:

feeding rollers by which the plastic film is fed intermittently for a length corresponding to the print pitch and stopped temporarily whenever being fed intermittently;

a first optical sensor disposed at a path along which the plastic film is fed intermittently, and detecting positions at which the pattern is printed on the plastic films repeatedly, to measure the print pitches individually;

a first stretching device disposed at the path and downstream of the first optical sensor and stretching the plastic film after measuring the print pitch and when the plastic film is stopped temporarily, to correct the print pitches individually;

a second optical sensor disposed at the path and detecting the positions after correcting the print pitches, to measure a sum of print pitches of a number of patterns; and a second stretching device disposed at the path and stretching the plastic film after measuring the sum of print pitches and when the plastic film is stopped temporarily, to correct the sum of print pitches.

2. The apparatus as set forth in claim 1 further comprising a control device arranged to measure the print pitches individually and obtain measurement values in response to detecting signals transmitted from the first optical sensor, the first stretching device being operated by the control device to stretch the plastic film and correct the print pitch when the measurement value is less than a reference value to result in a difference exceeding a predetermined value, between the measurement value and the reference value.

3. The apparatus as set forth in claim 2 wherein the control device is arranged to recognize if the print pitch contains a short or excess correcting amount after correcting, the short or excess correcting amount being stored in the control device and then cleared by the measurement value of next print pitch to obtain a cleared value, the first stretching device being operated by the difference between the cleared value, which is used as the measurement value, and the reference value.

4. The apparatus as set forth in claim 2 wherein the predetermined value comprises a minimum stretching amount predetermined in the first stretching device, the first stretching device being operated by the control device to stretch the plastic film when the measurement value is less than the reference value to result in the difference exceeding the minimum stretching amount, the control device being arranged to recognize if the print pitch is shortage by an uncorrected amount less than the minimum stretching amount after correcting, the uncorrected amount being stored in the control device and then subtracted from the measurement value of next print pitch to obtain a subtracted value, the first stretching device being operated by the difference between the subtracted value, which is used as the measurement value, and the reference value.

5. The apparatus as set forth in claim 1 further comprising a control device arranged to measure the sum of print pitches of the number of patterns to obtain a measurement value in response to a detecting signal transmitted from the second optical sensor, the second stretching device being operated by the control device to stretch the plastic film and correct the sum of print pitches when the measurement value is less than a reference value to result in a difference exceeding a predetermined value, between the measurement value and the reference value.

6. The apparatus as set forth in claim 5 wherein the control device is arranged to recognize if the sum of print pitches contains a short or excess correcting amount after correcting, the short or excess correcting amount being stored in the control device and then cleared by the measurement value of next sum of print pitches to obtain a cleared value, the second stretching device being operated by the difference between the cleared value, which is used as the measurement value, and the reference value.

7. The apparatus as set forth in claim 5 wherein the predetermined value comprises a minimum stretching amount predetermined in the second stretching device, the second stretching device being operated by the control device to stretch the plastic film when the measurement value is less than the reference value to result in the difference exceeding the minimum stretching amount, the control device being arranged to recognize if the sum of print pitches is shortage by an uncorrected amount less than the minimum stretching amount after correcting, the uncorrected amount being stored in the control device and then subtracted from the measurement value of next sum of print pitches to obtain a subtracted value, the second stretching device being operated by the difference between the subtracted value, which is used as the measurement value, and the reference value.

8. The apparatus as set forth in claim 1 wherein an upstream optical sensor is disposed at the path, a downstream optical sensor being disposed at the path and downstream of the upstream optical sensor and spaced from the upstream optical sensor at a distance corresponding to an integral multiple of reference value of print pitches, the upstream and downstream optical sensors detecting the positions at which the pattern is printed on the plastic film repeatedly, the first optical sensor comprising the upstream optical sensor to measure the print pitches individually, the second optical sensor comprising the upstream and downstream optical sensors to measure the sum of print pitches of the number of patterns.

9. The apparatus as set forth in claim 8 wherein an additional optical sensor is disposed at the path and upstream of the upstream optical sensor and spaced from the upstream optical sensor at a distance corresponding to the print pitch or an integral multiple thereof, the additional optical sensor detecting the positions at which the pattern is printed on the plastic film repeatedly, the first optical sensor comprising the upstream optical sensor and the additional optical sensor to measure the print pitches individually.

10. The apparatus as set forth in claim 8 wherein the first stretching device is disposed downstream of the upstream optical sensor, the downstream optical sensor being disposed downstream of the first stretching device, the second stretching device being disposed downstream of the downstream optical sensor.

11. The apparatus as set forth in claim 8 wherein the first and second stretching devices comprise a single stretching device disposed downstream of the upstream optical sensor, the downstream optical sensor being disposed downstream of the single stretching device.

12. The apparatus as set forth in claim 8 wherein the feeding rollers are disposed at the path and downstream of the upstream optical sensor, the feeding rollers being operated by a control device in response to the detecting signals transmitted from the upstream optical sensor so that the plastic film should be fed intermittently for the length corresponding to the print pitch.

13. The apparatus as set forth in claim 1 wherein the apparatus is incorporated in a machine including a heat seal device and a cross cutter, the plastic films being superposed with each other after correcting the print pitches, the plastic films being then heat sealed with each other by the heat seal device and cross cut by the cross cutter, to successively make plastic bags.

14. An apparatus for correcting print pitches at which a pattern is printed on a plastic film repeatedly, the plastic film being fed longitudinally thereof, the apparatus comprising:
 an upstream optical sensor disposed at a path along which the plastic film is fed, to detect positions at which the pattern is printed on the plastic film repeatedly;
 feeding rollers disposed at the path and downstream of the upstream optical sensor, the plastic film being fed by the feeding rollers;
 a first stretching device disposed at the path and downstream of the upstream optical sensor, to stretch the plastic film;
 a downstream optical sensor disposed at the path and downstream of the feeding rollers and the first stretching device and spaced from the upstream optical sensor at a distance corresponding to an integral multiple of reference value of print pitch, to detect the positions at which the pattern is printed on the plastic film repeatedly;
 a second stretching device disposed at the path and downstream of the downstream optical sensor, to stretch the plastic film; and
 a control device arranged to receive detecting signals transmitted from the upstream and downstream optical sensors, the feeding rollers being operated by the control device in response to the detecting signals transmitted from the upstream optical sensor so that the plastic film should be fed intermittently for a length corresponding to the print pitch and stopped temporarily whenever being fed intermittently, the control device being further arranged to measure the print pitches individually to obtain measurement values in response to the detecting signals transmitted from the upstream optical sensor, the first stretching device being operated by the control device to stretch the plastic film and correct the print pitches individually when the measurement value is less than a reference value of print pitch to result in a difference exceeding a first predetermined value and when the plastic film is stopped temporarily, the control device being further arranged to measure a sum of print pitches of a number of patterns to obtain an additional measurement value in response to the detecting signals transmitted from the upstream and downstream optical sensors, the second stretching device being operated by the control device to stretch the plastic film and correct the sum of print pitches when the additional measurement value is less than a reference value of sum of print pitches to result in a difference exceeding a second predetermined value and when the plastic film is stopped temporarily.

15. An apparatus for correcting print pitches at which a pattern is printed on a plastic film repeatedly, the plastic film being fed longitudinally thereof, the apparatus comprising:
 an upstream optical sensor disposed at a path along which the plastic film is fed, to detect positions at which the pattern is printed on the plastic film repeatedly;
 feeding rollers disposed at the path and downstream of the upstream optical sensor, the plastic film being fed by the feeding rollers;
 a plastic film stretching device disposed at the path and downstream of the upstream optical sensor, to stretch the plastic film;
 a downstream optical sensor disposed at the path and downstream of the feeding rollers and the plastic film stretching device and spaced from the upstream optical sensor at a distance corresponding to an integral multiple of reference value of print pitch, to detect the positions at which the pattern is printed on the plastic film repeatedly; and
 a control device arranged to receive detecting signals transmitted from the upstream and downstream optical sensors, the feeding rollers being operated by the control device in response to the detecting signals transmitted from the upstream optical sensor so that the plastic film should be fed intermittently for a length corresponding to the print pitch and stopped temporarily whenever being fed intermittently, the control device being further arranged to measure the print pitches individually to obtain measurement values in response to the detecting signals transmitted from the upstream optical sensor, the plastic film stretching device being operated by the control device to stretch the plastic film and correct the print pitches individually when the measurement value is less than a reference value of print pitch to result in a difference exceeding a first predetermined value and when the plastic film is stopped temporarily, the control device being further arranged to measure a sum of print pitches of a number of patterns to obtain an additional measurement value in response to the detecting signals transmitted from the upstream and downstream optical sensors, the plastic film stretching device being operated by the control device to stretch the plastic film and correct the sum of print pitches when the additional measurement value is less than a reference value of sum of print pitches to result in a difference exceeding a second predetermined value and when the plastic film is stopped temporarily.

* * * * *